US008578650B2

(12) United States Patent
Myntti

(10) Patent No.: US 8,578,650 B2
(45) Date of Patent: Nov. 12, 2013

(54) GREENHOUSE

(76) Inventor: Asko Myntti, Vahakyro (FI)

( * ) Notice: Subject to any disclaimer, the term of this patent is extended or adjusted under 35 U.S.C. 154(b) by 295 days.

(21) Appl. No.: 13/119,595

(22) PCT Filed: Sep. 16, 2009

(86) PCT No.: PCT/FI2009/050742
§ 371 (c)(1),
(2), (4) Date: Mar. 17, 2011

(87) PCT Pub. No.: WO2010/034882
PCT Pub. Date: Apr. 1, 2010

(65) Prior Publication Data
US 2011/0167716 A1    Jul. 14, 2011

(30) Foreign Application Priority Data

Sep. 23, 2008  (FI) ..................... 20085893
Jun. 29, 2009  (FI) ..................... 20095734

(51) Int. Cl.
*A01G 9/00*      (2006.01)
(52) U.S. Cl.
USPC .............................................. 47/17
(58) Field of Classification Search
USPC .............................................. 47/17
See application file for complete search history.

(56) References Cited

U.S. PATENT DOCUMENTS

| 4,019,554 | A | | 4/1977 | Rasmussen | |
|---|---|---|---|---|---|
| 4,195,441 | A | * | 4/1980 | Baldwin | 47/17 |
| 4,242,833 | A | * | 1/1981 | Maes, Jr. | 47/17 |
| 4,414,784 | A | * | 11/1983 | Masters | 52/73 |
| 4,996,791 | A | * | 3/1991 | Sprung | 47/17 |
| 5,001,859 | A | * | 3/1991 | Sprung | 47/17 |
| 5,056,259 | A | | 10/1991 | Allen | |
| 5,813,168 | A | | 9/1998 | Clendening | |
| 2007/0062105 | A1 | * | 3/2007 | Stevens | 47/17 |

FOREIGN PATENT DOCUMENTS

| FR | 2522929 | | 9/1983 |
|---|---|---|---|
| FR | 2522929 | A * | 9/1983 |
| GB | 2215357 | | 9/1989 |
| GB | 2403125 | | 12/2004 |
| JP | 8130982 | | 5/1996 |
| WO | 9321755 | | 11/1993 |

* cited by examiner

*Primary Examiner* — Kimberly Berona
*Assistant Examiner* — Joshua Huson
(74) *Attorney, Agent, or Firm* — Mendelsohn, Drucker and Dunleavy, P.C.

(57) ABSTRACT

The present invention relates to a greenhouse comprising outside walls provided with translucent surfaces (2) such that light may be received into the greenhouse (3) from at least two geographical directions, a roof structure (7) and a roof (6) provided with an insulating material portion. The invention is characterized in that the outside walls, in connection with the translucent surfaces (2), are provided with a light reflecting yard structure which resides below the translucent surfaces (2), above a ground surface (50), and extending away from the outside wall. The greenhouse (3) may further comprise vertically positioned light reflecting surface elements (40) and light reflecting shade elements (44) movable in a direction parallel with the transparent surfaces (2).

18 Claims, 6 Drawing Sheets

Parallel series of measurements 1-3 are presented for each step

GREENHOUSE

BACKGROUND OF THE INVENTION

The invention relates to a greenhouse according to the preamble of claim 1, which is particularly suited for northern conditions wherein growing requires both artificial light and additional heating.

Energy costs represent an extremely large item of expenditure in greenhouse cultivation. For instance in 2000 to 2006, electricity costs almost doubled and fuel costs increased approximately 40%. Further, energy production utilizes large amounts of fossil fuels for which saving goals relating to environmental protection exist.

The temperature at latitudes north is highly significantly lower than at latitudes south. The existing basic models of greenhouses are mainly designed for southern conditions and are thus often poorly suited for our cold conditions. The energy consumption of greenhouses is extremely high in winter since glass roofs and walls of the greenhouses that receive the smallest amount of sunlight are poorly thermally insulated. On the other hand, in the summer the problem with the existing greenhouses is that owing to the long days the thermal load tends to become even too heavy.

An attempt has been made to partially solve these problems e.g. by structural procedures according to patent publication GB 2215357. Admittedly, such a greenhouse according to the publication has been insulated better than before but, on the other hand, these structural solutions result in the greenhouse having to be provided with additional lighting in order for the total luminous efficiency required by the plants to be achieved under all conditions.

The above-mentioned patent publication also discloses movable and reflecting element solutions to be placed outside a building. However, the structural and functional solutions of such elements are not at all usable in the ice and snow conditions of the northern winter.

BRIEF DESCRIPTION OF THE INVENTION

An object of the invention is thus to develop the structure of a greenhouse so as to enable a better solution to be provided for the aforementioned problems. This object is achieved by a greenhouse having the characteristics defined in the claims according to this invention.

Particularly the present problems can be solved by combining the characteristics as disclosed in the characterizing part of claim 1. Preferred embodiments of the invention are disclosed in the dependent claims.

The invention is based on the idea that in connection with translucent parts of a building, such as windows, the outside walls are provided with light reflecting surfaces which at the same time form a part of a yard solution surrounding the building. In this solution, the yard resides below the translucent surfaces and extends away from the outside wall such that the light reflecting surfaces direct beams of light arriving at all times of the year efficiently into the greenhouse.

The solution according to the present invention provides considerable advantages. Thus, such a yard solution external to the greenhouse and having a large surface area efficiently compensates for a radiation loss otherwise produced by opaque roofs. The light reflecting surfaces may preferably be positioned on the east, south and west sides of the greenhouse and they are constructed to have a suitable inclination. Owing to their ground-supported structure, such light reflecting surfaces may be provided with a sufficiently large useful area without subjecting these surfaces to stresses caused e.g. by a snow load that could break them.

In addition to the light being reflected to the greenhouse, these reflecting surfaces provide a maintenance-free yard area at least partly surrounding the greenhouse, wherein weeds and contagious plant diseases are not allowed to spread. The reflecting yard solution also prevents detrimental animals, such as rodents, birds as well as insects, from gaining a foothold in the immediate vicinity of the greenhouse. Simultaneously, the inclined structure of the surfaces of the yard enables rain and melting water to be recovered, which makes the greenhouse less dependent on external water supply.

The ceiling of the building is fixed, opaque and thermally insulated. The insulating material thickness of the ceiling may be set to a desired level, e.g. by increasing the insulating material thickness of a roof. The fact that the structure is a fixed one enables significantly better coefficients of thermal transmittance, i.e. U-values, to be achieved than in the existing greenhouses. A U-value of 0.15 $W/m^2$ K is easily achieved for the fixed ceiling. The wall facing the north is opaque and thermally well insulated, and a U-value of 0.20 $W/m^2$ K is easily achieved therefor. For the sake of comparison, it may be said that U-values converted to the bottom surface area of the existing greenhouses usually reside between 6 and 11 $W/m^2$ K.

As distinct also from the known movable roof solutions, the present solution is advantageous in that the structure of the fixed ceiling may be sealed such that the abundant moisture from the greenhouse is not allowed to damage the structures of the upper part of the building.

The ceiling and the back wall are preferably coated with a highly light reflecting material, such as a mirror or a material having a white coating, such as sheet metal. The floor may also be covered with a white material, such as plastic, in order to increase the reflection of light and to decrease the drying up of the soil. At the same time, the moisture stress of indoor air is reduced.

The greenhouse according to the invention utilizes both the sunlight directly entering the greenhouse and the light being reflected from the yard area and the atmosphere. As to artificial light, the structure operates in an opposite manner, i.e. it prevents light and heat from exiting the greenhouse. The south, east and west façades of the greenhouse are made from a transparent material, such as glass or plastic. Thus, according to calculations conducted, the invention enables the normal high energy consumption of greenhouses to be reduced to less than one third as compared to the existing control greenhouses.

According to an embodiment, the light reflecting surfaces extend away from the outside wall by a length L, which is preferably 1.5 times, more preferably 2 times, greater than a height H of the translucent surfaces. This is advantageous in that the surface area of the light reflecting surfaces is to be as large as possible.

It has been stated that a best end result is achieved when light meets a translucent surface at an angle of incidence which is 0 to 60 degrees from the horizontal plane. At our latitudes this means that the surfaces reflecting light to the greenhouse are arranged at a horizontal plane or in a direction downwards inclined therefrom which is preferably 0 to 15 degrees towards the south and 0 to 20 degrees towards the east and the west. More preferably, the light reflecting surfaces are arranged to be inclined 0 to 10 degrees towards the south and 5 to 15 degrees towards the east and the west. Most preferably, the light reflecting surfaces are arranged to be inclined 0 to 5 degrees towards the south and 8 to 12 degrees towards the east and the west. This is advantageous in that light may be efficiently reflected into the greenhouse also at low solar degrees. At higher solar degrees light is reflected to solar panels provided on the roof. Being downwards inclined from the translucent surface, in the thaw the light reflecting surfaces are even by themselves relieved from snow collected thereon as the snow falls off the inclined surface.

According to one embodiment, the greenhouse further comprises vertically positioned light reflecting surface elements. This increases the reflecting surface area external to the building. The vertically positioned light reflecting surface elements may be fastened to the outside wall pivotally such that they may be turned to project in different directions from the outside wall. In such a case, light may be reflected into the greenhouse as much as possible at different times of the day and the year.

The vertically positioned surface elements may also be made motorizedly turnable. The advantage of this is that the surface elements may be programmed to turn according to the position of the sun, which enables a constant maximum light reflection to be achieved into the greenhouse.

According to one embodiment, the greenhouse further comprises light reflecting shade elements movable in a direction parallel with the translucent surfaces. The material of a shade element, such as a roller curtain, is opaque, and in the evenings and at night it is to reflect artificial light back towards the plants as well as at the same time to prevent artificial light from escaping outside. The energy consumption of lighting is reduced since the exit of light from the building may be diminished. The usual light pollution from greenhouses caused by artificial light is prevented by opaque wall and ceiling materials and opaque roller curtains whose inner surface is made from a light reflecting material.

The light reflecting surfaces may be made from a material having a good reflection property, such as stainless steel metal plates. According to tests conducted, in sunny weather a highly significant amount of light is transmitted from a reflecting surface made from stainless steel. Further, being a weather-resistant material, stainless steel is well suitable as a reflecting material external to a building.

At the time of dusk and at night, when artificial lighting is in use, opaque shade elements, such as roller curtains or the like, whose inner surface is made from a material which reflects light back to the plants, may be lowered on the side of transparent walls of the greenhouse. The function of the roller curtains is thus to prevent artificial light from escaping outside through the transparent parts of the greenhouse. Consequently, the light pollution caused by the greenhouse will be minimal.

Combined, double glazing and roller curtains give a relatively good U-value for the transparent east, south and west facing walls.

Inside the greenhouse, light which is not used by the plants for photosynthesis is converted into thermal radiation, and is thus useful. The roof covering, which is opaque, may be provided with solar cells, and energy produced by the solar cells is used e.g. for heating irrigation water or for artificial lighting. The greenhouse is further equipped with a good heat recovery system for ventilation exit air, such energy being used for heating the incoming air and thus yielding major savings in energy.

In summer, the opaque roof, the insulating material portion of the ceiling and the solar cells prevent the greenhouse from becoming exposed to excessive heat and light during the daytime.

Further advantages provided by the invention will be disclosed in the following in connection with describing special embodiments of the invention in closer detail.

BRIEF DESCRIPTION OF THE FIGURES

The invention is now described in closer detail in connection with preferred embodiments and with reference to the accompanying drawings, in which.

DETAILED DESCRIPTION OF PREFERRED EMBODIMENTS

Figure 1:
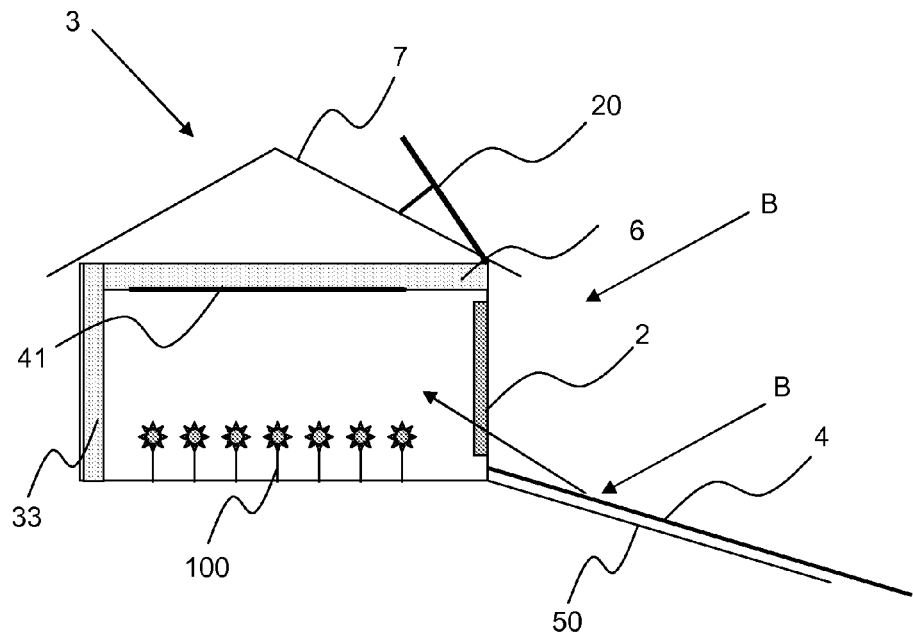
FIG. 1 shows a schematic vertical section of a basic solution of a greenhouse.

In the present figures, the greenhouse has not been shown to scale, but the figures are schematic, illustrating the schematic structure and operation of different preferred embodiments of the greenhouse. Thus, structural parts indicated by reference numerals in the accompanying figures correspond with structural parts indicated with reference numerals in this specification.

FIG. 1 thus shows a greenhouse 3 comprising an opaque roof structure 7. The roof structure is provided with a fixed insulated roof 6 or one is provided in connection therewith. In the exemplary case according to the figure, the roof structure 7 of the greenhouse 3 is provided with solar panels 20. Outside walls of the greenhouse comprise, on one hand, translucent surfaces 2 and, on the other hand, opaque outside wall portions 33. The outside wall portion 33 is insulated in a conventional manner by using constructional solutions known per se. The translucent surfaces, such as windows, are positioned in geographical directions from which sunlight B may be received into the greenhouse.

Light reflecting surfaces 4 are provided in connection with the translucent surfaces 2. Preferably, the light reflecting surfaces are metal plates having a good reflection property. Measurements have shown that stainless steel plates provide most excellent properties for this purpose. The light reflecting surfaces 4 are placed on a ground surface 50 such that they extend away from the outside wall, being arranged with respect thereto substantially horizontally or, preferably, in a direction advancing downwards in an inclined manner, thus forming a part of a yard solution surrounding the greenhouse.

According to tests conducted, in sunny weather a reflecting surface made from stainless steel transmits a highly significant amount of light. In addition, being a weatherproof material, stainless steel is highly suitable as a reflecting material external to a building.

Measurement results are shown below in the form of tables, the first one specifying tests conducted in laboratory conditions. This shows that when examining the reflection of artificial light, a stainless steel plate achieved on average more than 70% of the reflection values of a mirror used for comparison. Further, it is to be noted that the results given by the stainless steel plate were about quadruple as compared with those given by a plate that has been painted white.

TABLE 1

|  | Mat. A | | Mat. B | | Mat. C | | Mat. D | |
| --- | --- | --- | --- | --- | --- | --- | --- | --- |
|  | Series 1 | Series 2 | Series 1 | Series 2 | Series 1 | Series 2 | Series 1 | Series 2 |
| Point A | 10.7 | 11 | 48.5 | 48.4 | 2.8 | 2.9 | 66.7 | 67.3 |
| Point B | 12 | 12.3 | 45.7 | 46.2 | 4.2 | 4.2 | 64.5 | 65.3 |
| Point C | 14.1 | 14.4 | 49.2 | 49.1 | 5.8 | 5.9 | 68.6 | 69.9 |
| Point D | 11.2 | 11.5 | 48.2 | 48.4 | 3.5 | 3.6 | 65.5 | 66.5 |
| Point E | 12.9 | 13.6 | 44.7 | 45.3 | 5.4 | 5.5 | 63.3 | 64.3 |
| Point F | 15 | 15.6 | 48.3 | 48.6 | 7.3 | 7.5 | 68.4 | 69.6 |
| Point G | 9.5 | 9.6 | 48 | 49 | 2.8 | 2.8 | 66.5 | 67.3 |
| Point H | 11.7 | 12.1 | 44.5 | 44.5 | 4.2 | 4.3 | 64.8 | 65.6 |
| Point I | 13.1 | 13.6 | 47.7 | 48 | 5.7 | 5.8 | 69.2 | 70 |
| Average | 12.24 | 12.63 | 47.20 | 47.50 | 4.63 | 4.72 | 66.39 | 67.31 |
| Total | 110.2 | 113.7 | 424.8 | 427.5 | 41.7 | 42.5 | 597.5 | 605.8 |

Results from measurements of indirect light conducted in a laboratory
- material A: white MDF plate painted with priming and finishing paint,
- material B: factory ready stainless steel plate,
- material C: matte black plate, and
- material D: glass mirror.

Points A to I represent different measurement points on the reception wall. Series 1 and 2 represent different measurements on the same wall.

Figure 9:
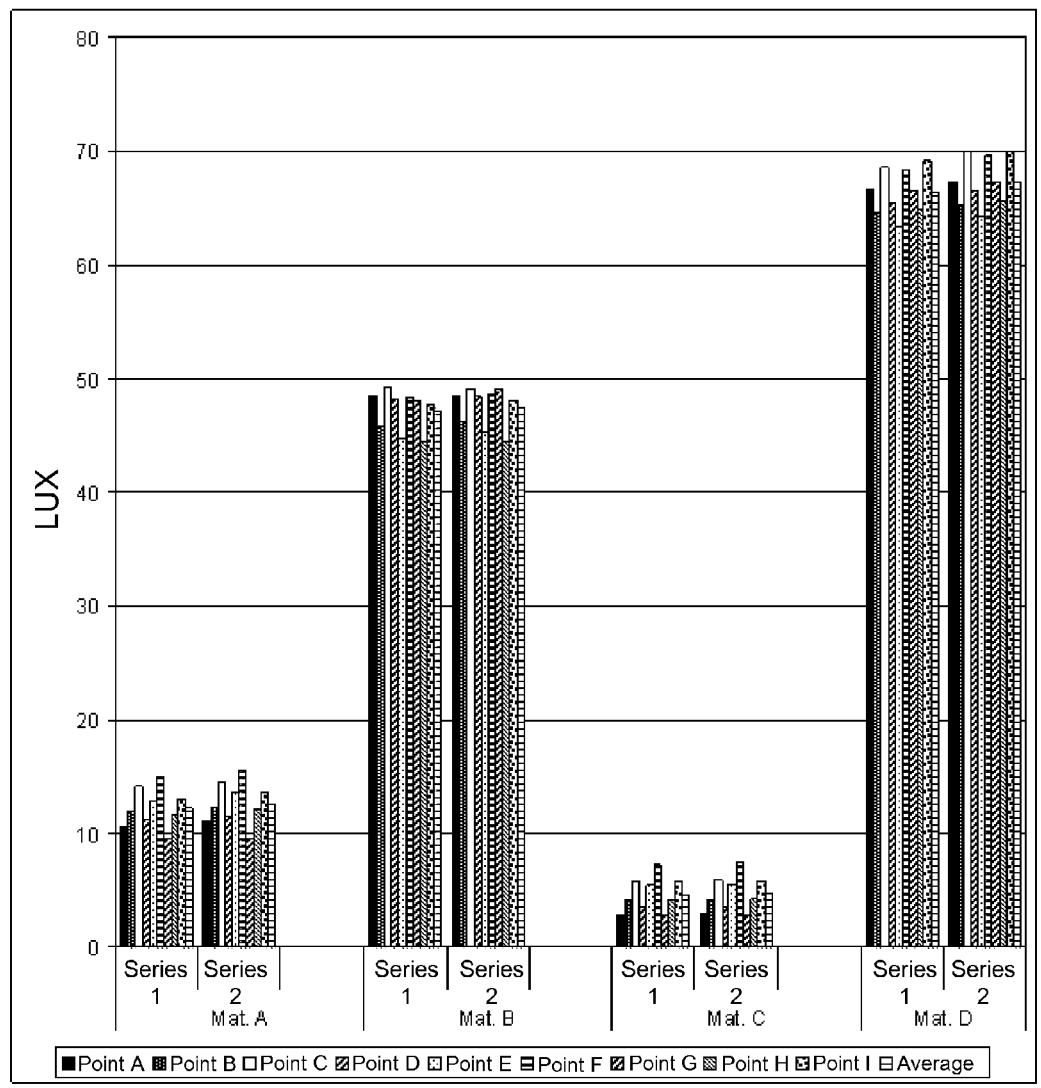
FIG. 9 shows results from measurements of indirect light conducted in a laboratory.

These measurement results are also shown graphically in FIG. 9.

When corresponding tests were conducted on a sunny day outdoors, i.e. in a real usage environment, unexpected results were obtained; these are shown in the accompanying second table. It can be concluded from the results that when examining the reflection of natural light, the factory ready stainless steel plate achieved on average well more than 90% of the reflection values of the mirror used for comparison. In single measurements the reflection of the stainless steel plate even exceeded the reflection of the mirror used for comparison. When comparing with one another the results obtained from the factory-made stainless steel plate and the plate painted white in this real usage environment, it may be stated that the results given by the stainless steel plate were almost 20 times higher (cf. the above-disclosed corresponding differences obtained in a laboratory that were only about four times greater).

TABLE 2

|  | Mat. A | Mat. B | Mat. C | Mat. D | Mat. E | Mat. F |
| --- | --- | --- | --- | --- | --- | --- |
| Stage I, $\alpha = 51°$ starting at 1 p.m. | | | | | | |
| Series 1 | 2030 | 87500 | 104 | 74000 | 45200 | 37 |
| Series 2 | 2320 | 72300 | 103 | 74400 | 38000 | 37 |
| Series 3 | 2190 | 62000 | 102 | 75700 | 42800 | 36 |
| Stage II, $\alpha = 43°$ starting at 3 p.m. | | | | | | |
| Series 1 | 2520 | 63000 | 175 | 69900 | 39000 | 57 |
| Series 2 | 2870 | 55700 | 198 | 68700 | 49100 | 76 |
| Series 3 | 2250 | 49000 | 183 | 61700 | 43200 | 70 |
| Stage III, $\alpha = 18°$ starting at 7 p.m. | | | | | | |
| Series 1 | 3420 | 57800 | 309 | 46400 | 29800 | 65 |
| Series 2 | 3660 | 30000 | 391 | 43000 | 18400 | 92 |
| Series 3 | 4860 | 35100 | 394 | 36500 | 16400 | 116 |
| Total | 26120 | 512400 | 1959 | 550300 | 321900 | 586 |
| Average | 2902 | 56934 | 218 | 61145 | 35767 | 65 |

Results from measurements of indirect light conducted in natural light outdoors
- material A: MDF plate painted with priming and finishing paint,
- material B: factory ready stainless steel plate,
- material C: matte black plate,
- material D: glass mirror,
- material E: polished stainless steel plate, and
- material F: crushed rock.

Where series 1 to 3 of stages conducted at different times represent different measurements on the reception wall. The incidence angle $\alpha$ of beams of light with respect to the horizontal plane at the time of starting the measurement is shown.

Figure 10:
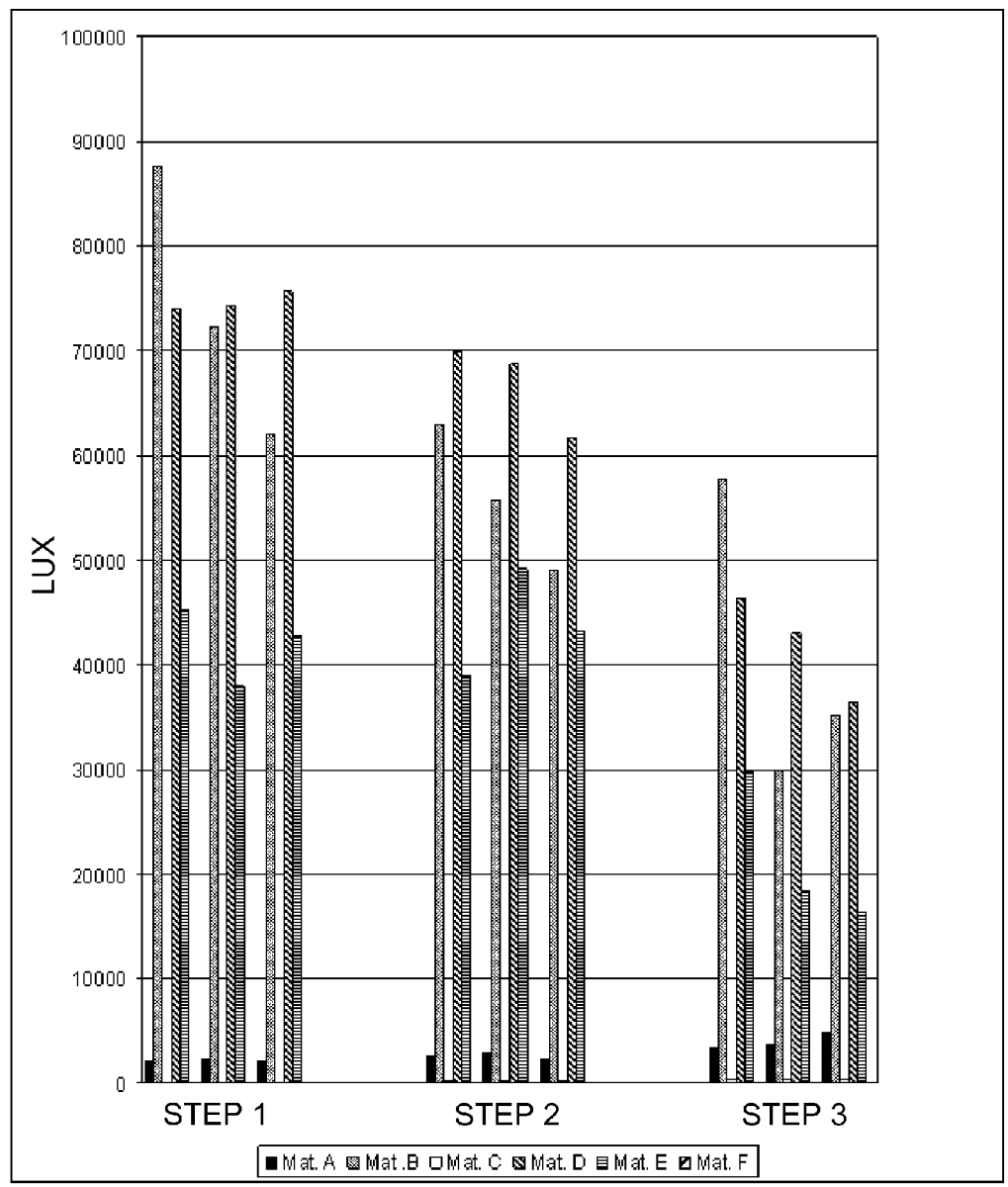
FIG. 10 shows results from measurements of indirect light conducted outdoors in natural light.

These measurement results are also presented graphically in FIG. 10. The figure shows for each material separately measurement series 1 to 3 according to the table. As can be seen in the figures, the reflection values of materials C and F are so modest that they can hardly be detected at the presentation accuracy of the figure. Material F, i.e. crushed rock, is a common surface material close to the walls of the existing greenhouses.

Beams of light arriving at the greenhouse 3 or produced therein by lamps are also reflected from a reflecting inner surface 41 on the lower surface of the ceiling. This inner surface, in turn, reflects beams of light that have hit it downwards to be utilized by the plants 100 being grown.

Figure 8:
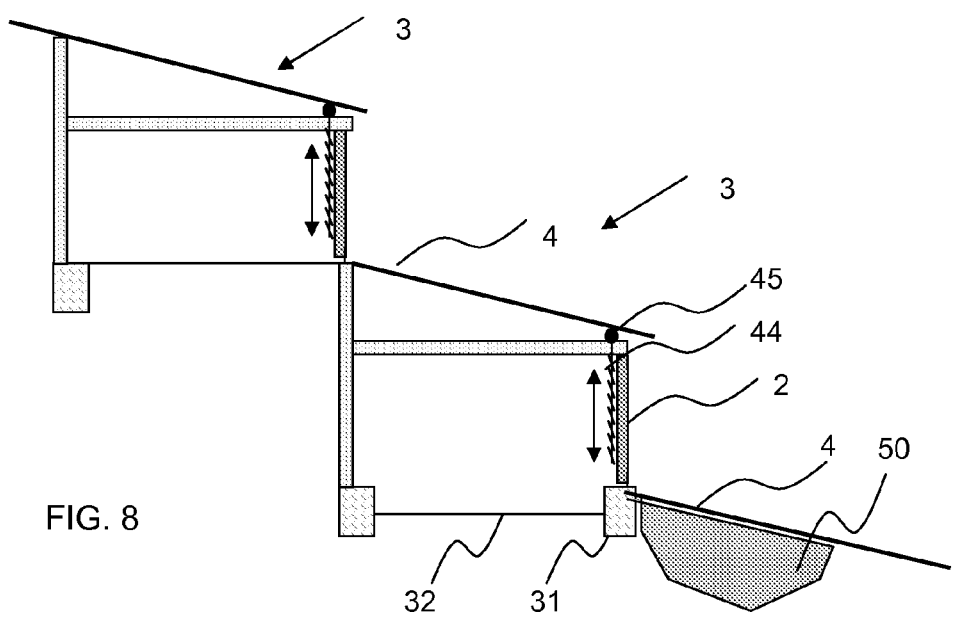
FIG. 8 shows a vertical section of another embodiment of a slope solution of a greenhouse.

The inside light reflecting wall surface of the greenhouse 3 may also be implemented in connection with windows by installing lowerable reflecting shade elements in connection with them, e.g. in a manner shown by FIG. 8.

Figure 2:
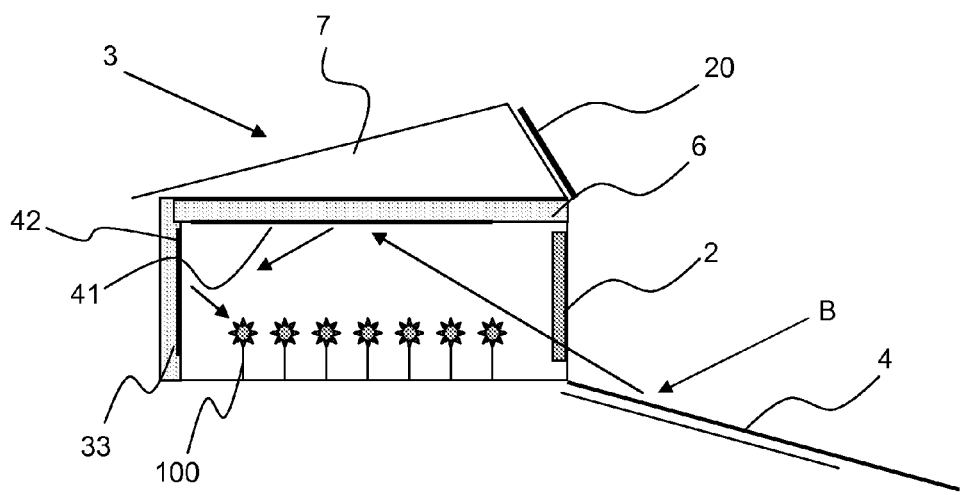
FIG. 2 shows a schematic vertical section of another embodiment of a greenhouse.

The embodiment of the greenhouse 3 according to FIG. 2 differs from the embodiment according to the figure in the shape of the roof structure 7. It is thus clear that the roof structure above the fixed insulated roof 6 may be varied in many different ways.

Figure 3:
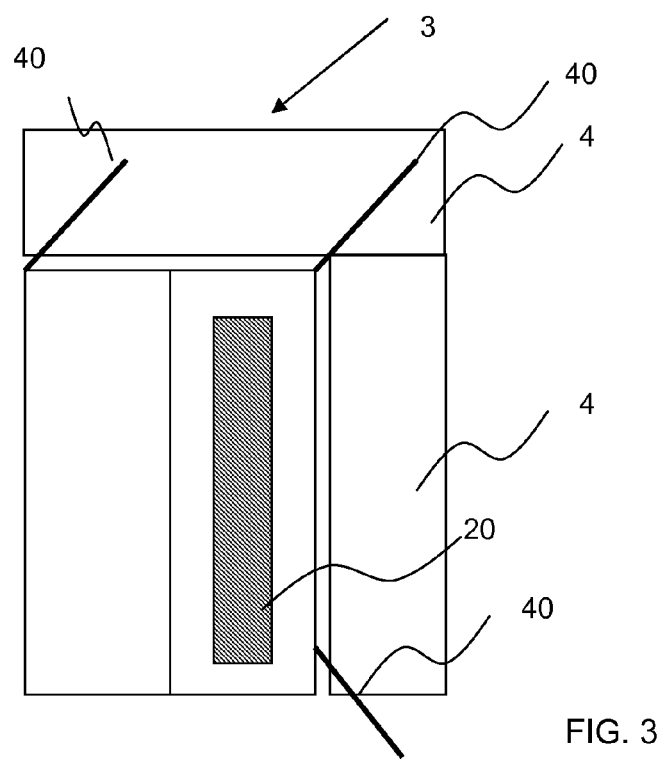
FIG. 3 is a top view showing a greenhouse equipped with reflecting surface elements.

FIG. 3 shows the greenhouse 3 as seen from above. The roof structure 7 of the greenhouse is provided with solar panels 20. In this embodiment of the greenhouse, the translucent surfaces 2 are placed on two adjacent sides. In such a case, sunlight may be received into the greenhouse from two geographical directions. Light reflecting surfaces 4 are provided in connection with the translucent surfaces. In addition to these, vertically positioned light reflecting surface elements 40 are arranged in connection with the greenhouse.

Figure 4:
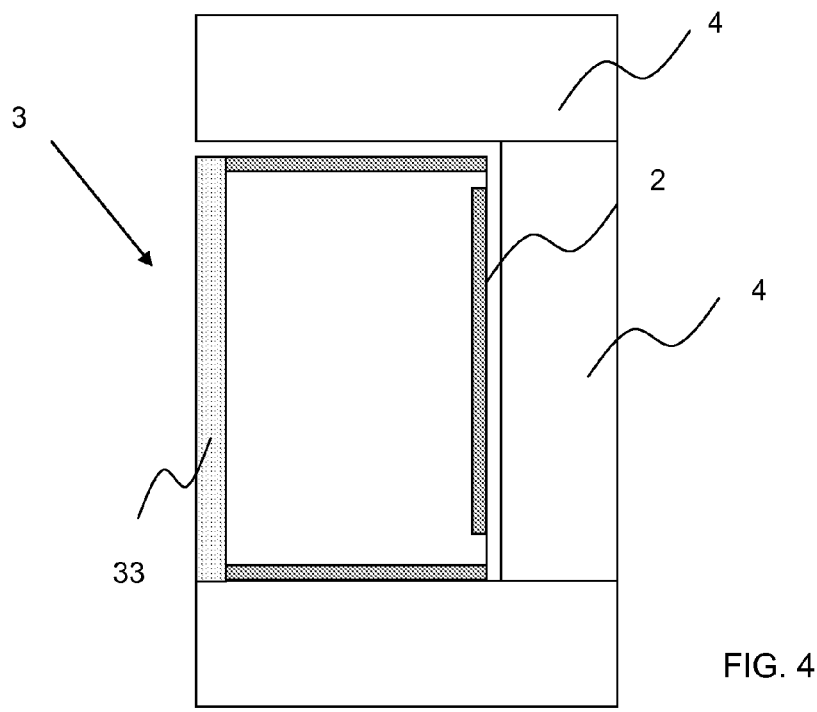
FIG. 4 shows a schematic horizontal section of an embodiment of a greenhouse equipped with light reflecting surfaces on three sides.

FIG. 4 shows a horizontal section of a second embodiment of the greenhouse 3. As above, the outside walls of the greenhouse are provided with translucent surfaces 2 and an opaque outside wall portion 33. In this embodiment, the translucent surfaces are placed on three sides of the greenhouse abutting on one another. This enables sunlight to be received into the greenhouse from three geographical directions. Light reflecting surfaces 4 are provided in connection with these translucent surfaces as well.

Figure 5:
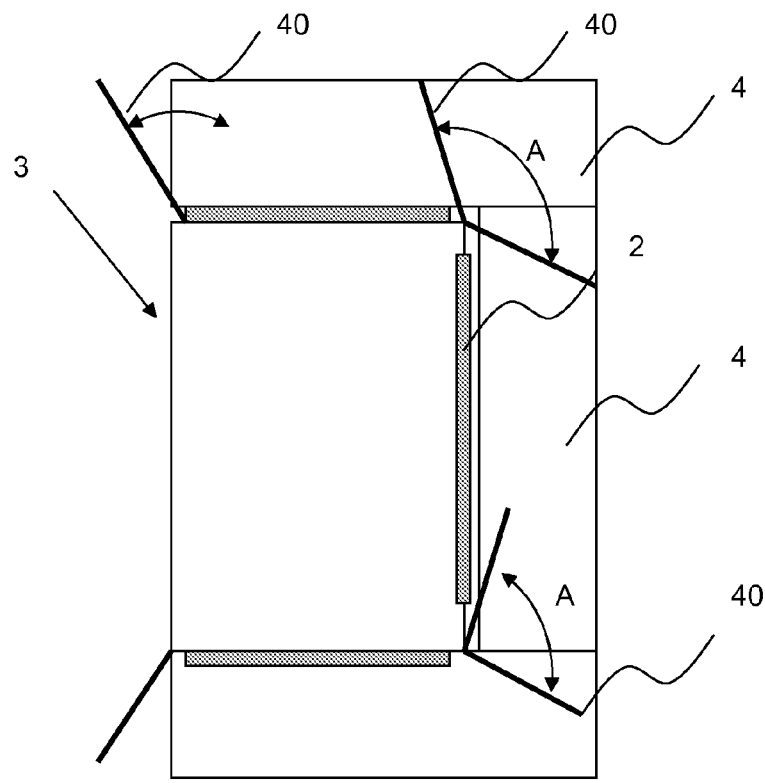
FIG. 5 shows an embodiment of the greenhouse according to FIG. 4 equipped with reflecting surface elements.

FIG. 5 shows a third embodiment of the greenhouse 3 as seen from above. Translucent surfaces 2 are placed on three sides of the greenhouse, enabling sunlight B to be received into the greenhouse from three geographical directions. Light reflecting surfaces 4 similar to those described above are provided at the front of these translucent surfaces. The greenhouse further comprises vertically positioned light reflecting surface elements 40. This enables the surface area of the sunlight reflecting surfaces to be increased and, also, light coming from the side to be reflected into the greenhouse more efficiently. The vertically positioned light reflecting surface elements 40 are preferably fastened to the outside wall pivotally such that they may be turned to protrude in different directions from the outside wall. In such a case, the amount of light being reflected inside may always be optimized at different times of the day. During the darkest winter months, the surface elements may be directed at the east end towards the southeast and at the west end towards the southwest. In such a case, the solution both protects the ends of the building against wind and reflects light into the greenhouse.

The vertically positioned surface elements 40 may be arranged to be motorizedly turnable. It is also possible that some of the vertically positioned surface elements are fixed while only some of them are motorizedly turnable.

Figure 6:
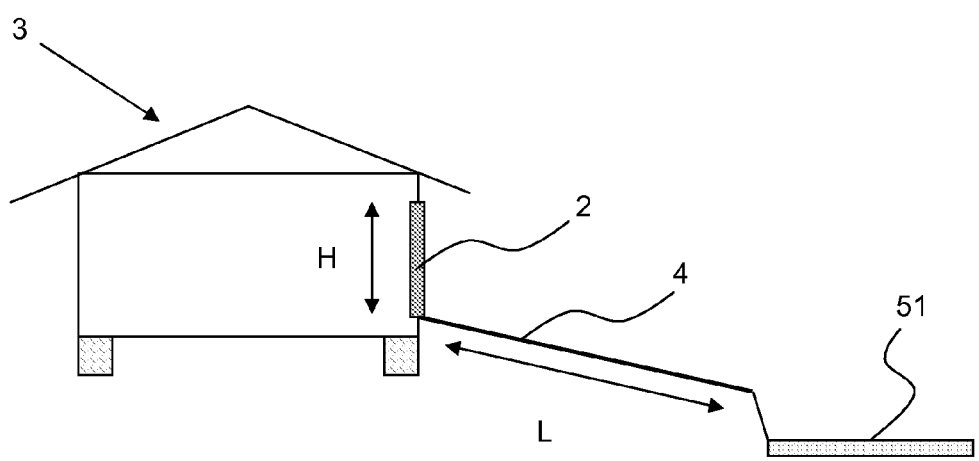
FIG. 6 shows a schematic vertical section of a greenhouse equipped with a service platform.

FIG. 6 shows an embodiment of the greenhouse 3 as seen from an end. The outside walls of the greenhouse 3 are provided with translucent surfaces 2 as described above. The translucent surfaces are positioned in geographical directions from which sunlight may be received into the greenhouse. Light reflecting surfaces 4, which preferably are metal plates having a good reflection property, such as stainless steel plates, are provided in connection with these translucent surfaces 2. The light reflecting surfaces are placed on the ground surface such that they extend away from the outside wall, being arranged with respect thereto substantially horizontally or in a direction advancing downwards in an inclined manner. The light reflecting surfaces 4 extend away from the outside wall by a length L, which is preferably at least 1.5 times and more preferably at least 2 times greater than a height H of the translucent surfaces 2. It is clear that this ratio of the height of the windows to the length of the reflecting surfaces is implementable in a similar manner in all embodiments disclosed in this specification. In addition, a side of the greenhouse is provided with a service platform 51 which resides below the reflecting surfaces 4. This enables the snow load transferred from the roof and the inclined light reflecting surface of the greenhouse to be removed easily.

Figure 7:
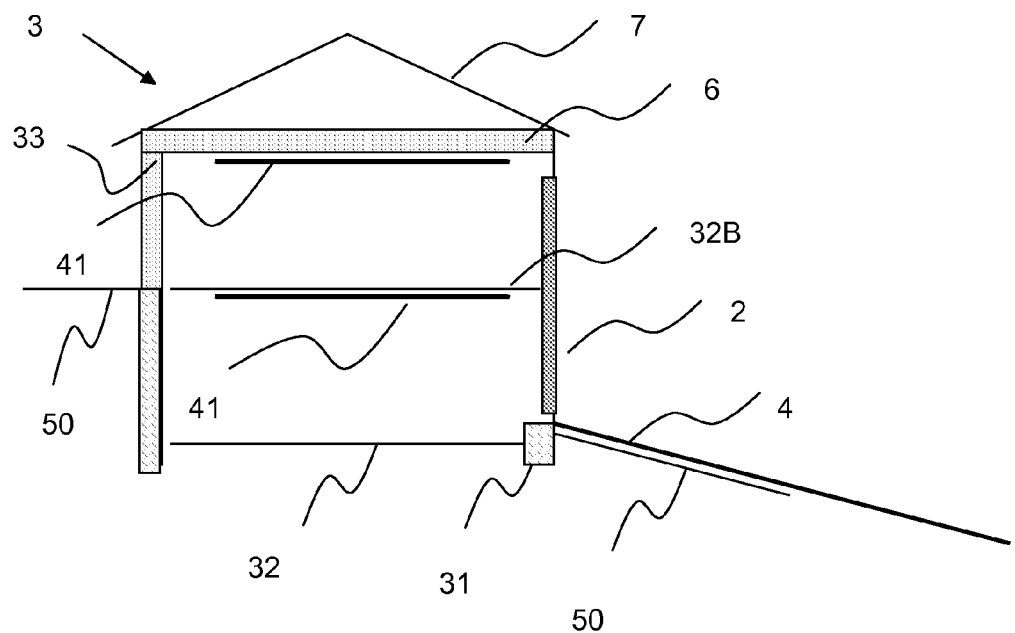
FIG. 7 shows a vertical section of an embodiment of a slope solution of a greenhouse.

Referring to FIG. 7, a greenhouse 3 having a two-storey structure is shown. As above, the greenhouse has an opaque roof structure 7. The roof structure is also provided with a fixed insulated roof 6 or one is provided in connection therewith. An intermediate floor or plane 32B is provided between a first storey and a second storey of the greenhouse. As in connection with the previous embodiments, the outside walls of the greenhouse are provided with translucent surfaces 2 and an opaque outside wall portion 33. The translucent surfaces are positioned in geographical directions from which sunlight may be received into the greenhouse. The underside of the ceiling and the plane 32B is provided with a reflecting inner surface 41 which, in turn, reflects beams of light that have hit it downwards to be utilized by plants being grown on different storeys. Light reflecting surfaces 4 similar to those described above are provided in connection with the translucent surfaces 2 as well.

FIG. 7 also shows a solution wherein a floor surface 32 of the greenhouse 3 has been lowered below the light reflecting surfaces 4 residing on the outside ground surface. This enables the amount of filling below the greenhouse 3 to be reduced. This also makes it easier to provide a sufficient inclination of the ground surface outside the greenhouse on the sides of a support structure 31 of the greenhouse. Further, in connection with tall plants, the vegetation does not reach the ceiling and prevent light from entering the deep parts of the greenhouse. The embodiment shown in FIG. 7 may be constructed e.g. on a slope wherein variation in the height of the ground surface 50 is wide.

FIG. 8 shows another embodiment of the slope solution for the greenhouse 3 as a vertical section. In this embodiment, the light reflecting surfaces 4 of the upper part of the greenhouse are positioned as the roof surface of the lower part such that they extend away from the outside wall, being arranged with respect thereto substantially horizontally or in a direction advancing downwards in an inclined manner.

The greenhouse 3 further comprises light reflecting shade elements 44 which are movable in a direction parallel with the translucent surfaces 2. The shade elements comprise a reflecting surface focusable on the inside of the greenhouse. The shade elements are moved by moving devices 45 which are preferably driven by a motor. These shade elements may be placed in connection with the translucent surfaces 2 of the greenhouse. For instance in the solution according to FIG. 4, they may be placed on three window sides. The shade elements 44 may be lowered when only artificial light is used in the greenhouse.

The shade elements 44 may also be utilized in connection with reception of sunlight. It is then advantageous to lower the reflecting shade elements 44 in windows from which no sunlight can be received. The lowered shade elements 44 enhance the utilization of sunlight conveyed into the greenhouse.

It is apparent to those skilled in the art that as technology advances, the basic idea of the invention may be implemented in many different ways. The invention and its embodiments are thus not restricted to the above-described examples but may vary within the scope of the claims.

The invention claimed is:

1. A greenhouse for year-round usage comprising
outside walls,
a roof structure,
a fixed roof provided with an insulating material portion,
the outside walls being provided with translucent surfaces such that light may be received into the greenhouse from at least two geographic directions,
light reflecting surfaces being provided in connection with the translucent surfaces on the outside walls,
wherein the light reflecting surfaces are positioned below the translucent surfaces on a ground surface, such that the light reflecting surfaces extend away from the outside wall, said light reflecting surfaces being arranged to extend from the outside wall in a direction advancing downwardly in an inclined manner, thus forming a part of a yard solution surrounding the greenhouse, the downwardly inclined direction of one of said light reflecting surfaces is towards the south 0 to 10 degrees and the downwardly inclined direction of another of said light reflecting surfaces is towards the east 5 to 15 degrees or the west 5 to 15 degrees, and
the light reflecting surfaces are made from metal plates.

2. The greenhouse as claimed in claim 1, wherein the light reflecting surfaces extend away from the outside wall by a length which is 1.5 to 2 times greater than a height of the translucent surfaces.

3. The greenhouse as claimed in claim 2, comprising at least three light reflecting surfaces wherein the downwards inclined direction is towards the south 0 to 10 degrees and towards the east and the west 5 to 15 degrees.

4. The greenhouse as claimed in claim 3, wherein the downwards inclined direction of the light reflecting surfaces is towards the south 0 to 5 degrees and towards the east and the west 8 to 12 degrees.

5. The greenhouse as claimed in claim 1, comprising at least three light reflecting surfaces and wherein the downwards inclined direction is towards the south 0 to 10 degrees and towards the east and the west 5 to 15 degrees.

6. The greenhouse as claimed in claim 5, wherein the downwards inclined direction of the light reflecting surfaces is towards the south 0 to 5 degrees and towards the east and the west 8 to 12 degrees.

7. The greenhouse as claimed in claim 1, wherein the greenhouse comprises vertically positioned light reflecting surface elements.

8. The greenhouse as claimed in claim 7, wherein the vertically positioned light reflecting surface elements are pivotally fastened to the outside wall such that the light reflecting surface elements may be turned to protrude in different directions from the outside wall.

9. The greenhouse as claimed in claim 8, wherein the vertically positioned surface elements are turned by a motor.

10. The greenhouse as claimed in claim 1, wherein the greenhouse comprises light reflecting shade elements movable in a direction parallel to the translucent surfaces.

11. The greenhouse as claimed in claim 1, wherein the metal plates are stainless steel plates.

12. The greenhouse as claimed in claim 11, wherein the light reflecting surfaces extend away from the outside wall by a length which is 1.5 to 2 times greater than a height of the translucent surfaces.

13. The greenhouse as claimed in claim 12, wherein the downwards inclined direction of the light reflecting surfaces is towards the south 0 to 5 and towards the east and the west 8 to 12 degrees.

14. The greenhouse as claimed in claim 11, wherein the downwards inclined direction of the light reflecting surfaces is towards the south 0 to 5 and towards the east and the west 8 to 12 degrees.

15. The greenhouse as claimed in claim 11, wherein the greenhouse comprises vertically positioned light reflecting surface elements.

16. The greenhouse as claimed in claim 15, wherein the vertically positioned light reflecting surface elements are pivotally fastened to the outside wall such that the light reflecting surface elements may be turned to protrude in different directions from the outside wall.

17. The greenhouse as claimed in claim 16, wherein the vertically positioned surface elements are turned by a motor.

18. The greenhouse as claimed in claim 11, wherein the greenhouse comprises light reflecting shade elements movable in a direction parallel to the translucent surfaces.

* * * * *